US012754962B2

(12) United States Patent
Adler

(10) Patent No.: US 12,754,962 B2
(45) **Date of Patent: *Oct. 6, 2026**

(54) SYSTEM TO GENERATE CONTEXTUAL QUERIES

(71) Applicant: Snap Inc., Santa Monica, CA (US)

(72) Inventor: Manny Jerrold Adler, Malibu, CA (US)

(73) Assignee: SNAP INC., Santa Monica, CA (US)

(*) Notice: Subject to any disclaimer, the term of this patent is extended or adjusted under 35 U.S.C. 154(b) by 389 days.

This patent is subject to a terminal disclaimer.

(21) Appl. No.: 18/129,024

(22) Filed: Mar. 30, 2023

(65) Prior Publication Data

US 2023/0237087 A1 Jul. 27, 2023

Related U.S. Application Data

(63) Continuation of application No. 16/732,068, filed on Dec. 31, 2019, now Pat. No. 11,921,773.

(51) Int. Cl.

| | |
|---|---|
| ***G06F 16/532*** | (2019.01) |
| ***G06F 16/535*** | (2019.01) |
| ***G06F 16/538*** | (2019.01) |
| ***G06F 16/58*** | (2019.01) |
| ***G06F 16/583*** | (2019.01) |
| ***G06F 16/587*** | (2019.01) |

(52) U.S. Cl.

CPC .......... *G06F 16/532* (2019.01); *G06F 16/535* (2019.01); *G06F 16/538* (2019.01); *G06F 16/5846* (2019.01); *G06F 16/5854* (2019.01); *G06F 16/5866* (2019.01); *G06F 16/587* (2019.01)

(58) Field of Classification Search

None

See application file for complete search history.

(56) References Cited

U.S. PATENT DOCUMENTS

| | | | |
|---|---|---|---|
| 9,569,451 B1 | 2/2017 | Crager | |
| 11,170,035 B2 | 11/2021 | Anvaripour et al. | |
| 11,921,773 B1 * | 3/2024 | Adler | G06F 16/587 |
| 2003/0195883 A1 | 10/2003 | Mojsilovic et al. | |
| 2006/0149700 A1 | 7/2006 | Gladish et al. | |
| 2008/0005091 A1 | 1/2008 | Lawler et al. | |
| 2008/0005105 A1 | 1/2008 | Lawler et al. | |
| 2008/0130936 A1 | 6/2008 | Lau et al. | |

(Continued)

OTHER PUBLICATIONS

Mojsilovic, A.—"ISee: Perceptual features for image library navigation"—SPIE 2002—pp. 266-277 (Year: 2002).*

(Continued)

*Primary Examiner* — Bernard Krasnic

(74) *Attorney, Agent, or Firm* — SCHWEGMAN LUNDBERG & WOESSNER, P.A.

(57) ABSTRACT

A contextual query system is configured to perform operations that include: causing display of a graphical user interface at a client device, the graphical user interface including a display of image data that comprises a set of image features; generating a query based on the set of image features of the image data; accessing media content based on the query at a repository, the repository comprising a collection of media content; and causing display of a presentation of the media content within the graphical user interface at the client device.

17 Claims, 10 Drawing Sheets

(56) References Cited

U.S. PATENT DOCUMENTS

| | | | |
|---|---|---|---|
| 2011/0085739 A1 | 4/2011 | Zhang et al. |
| 2012/0251011 A1 | 10/2012 | Gao et al. |
| 2013/0128041 A1 | 5/2013 | Hershey et al. |
| 2016/0379371 A1 | 12/2016 | Chen et al. |
| 2017/0262139 A1 | 9/2017 | Patel et al. |
| 2018/0069815 A1 | 3/2018 | Fontana et al. |
| 2018/0359349 A1 | 12/2018 | Graylin et al. |
| 2019/0080168 A1 | 3/2019 | Nowak-przygodzki et al. |

OTHER PUBLICATIONS

Mojsilovic, A.—"Semantic-Friendly Indexing and Quering of Images Based on the Extraction of the Objective Semantic Cues"—International Journal of Computer Vision 2004—pp. 79-107 (Year: 2004).*

"U.S. Appl. No. 16/732,068, Final Office Action mailed Jun. 17, 2022", 10 pgs.

"U.S. Appl. No. 16/732,068, Final Office Action mailed Nov. 15, 2022", 13 pgs.

"U.S. Appl. No. 16/732,068, Non Final Office Action mailed Feb. 15, 2023", 10 pgs.

"U.S. Appl. No. 16/732,068, Non Final Office Action mailed Sep. 22, 2022", 11 pgs.

"U.S. Appl. No. 16/732,068, Non Final Office Action mailed Dec. 10, 2021", 14 pgs.

"U.S. Appl. No. 16/732,068, Notice of Allowance mailed Mar. 8, 2023", 15 pgs.

"U.S. Appl. No. 16/732,068, Notice of Non-Compliant Amendment mailed Feb. 10, 2022" 2 pgs.

"U.S. Appl. No. 16/732,068, Response filed Jan. 10, 2023 to Final Office Action mailed Nov. 15, 2022", 12 pgs.

"U.S. Appl. No. 16/732,068, Response filed Feb. 7, 2022 to Non Final Office Action mailed Dec. 10, 2021", 9 pgs.

"U.S. Appl. No. 16/732,068, Response filed Feb. 24, 2023 to Non Final Office Action mailed Feb. 15, 2023", 9 pgs.

"U.S. Appl. No. 16/732,068, Response filed Apr. 11, 2022 to Notice of Non-Compliant Amendment mailed Feb. 10, 2022", 10 pgs.

"U.S. Appl. No. 16/732,068, Response filed Jul. 8, 2022 to Final Office Action mailed Jun. 17, 2022", 10 pgs.

"U.S. Appl. No. 16/732,068, Response filed Oct. 21, 2022 to Non Final Office Action mailed Sep. 22, 2022", 10 pgs.

U.S. Appl. No. 16/732,068, filed Dec. 31, 2019, System to Generate Contextual Queries.

* cited by examiner

SYSTEM TO GENERATE CONTEXTUAL QUERIES

CROSS-REFERENCE TO RELATED APPLICATION

This application is a continuation of U.S. patent application Ser. No. 16/732,068, filed Dec. 31, 2019, which is incorporated by reference herein in its entirety.

TECHNICAL FIELD

Embodiments of the present disclosure relate generally to mobile computing technology and, more particularly, but not by way of limitation, to a system to generate queries.

BACKGROUND

Information retrieval is the activity of obtaining information system resources that are relevant to an information need from a collection of those resources. Search may commonly be based on full-text of other content-based indexing.

Traditionally, an information retrieval process begins when user manually enters a query into the system via a text input field. A query is a formal statement of information needs, for example search strings in web search engines. In information retrieval a query does not necessarily identify a single object in the collection, but rather may identify several objects that match the query, perhaps with different degrees of relevancy.

A data object is an entity that may be represented by information in a content collection of database. User queries may be matched against database information. Depending on the application, the data object may include text documents, images, audio, as well as video and other multimedia content. Often these data objects themselves are not kept or stored directly in the information retrieval system but are instead represented in the system by identifiers such as document surrogates or metadata.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
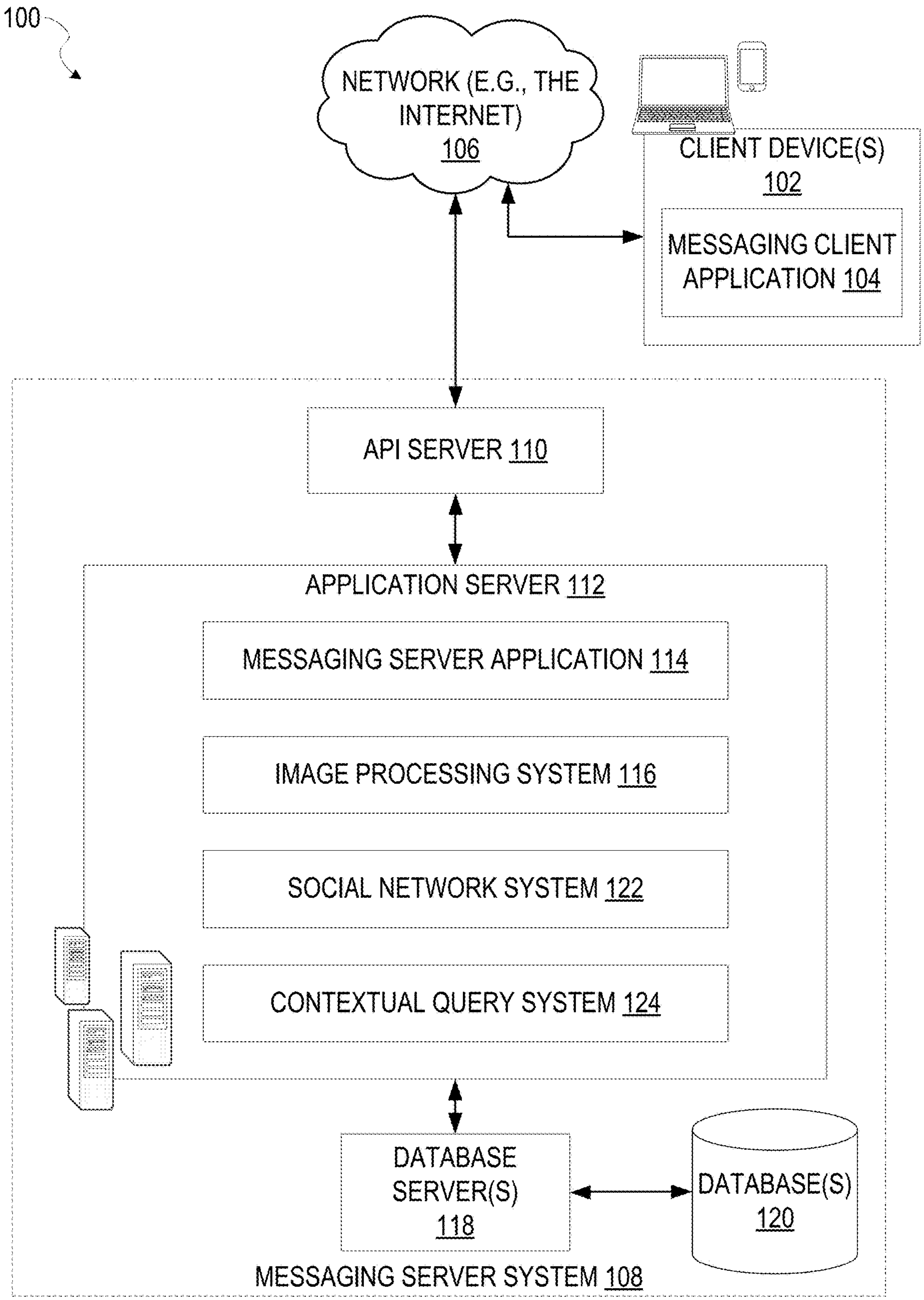
FIG. 1 is a block diagram showing an example messaging system for exchanging data (e.g., messages and associated content) over a network in accordance with some embodiments, wherein the messaging system includes a contextual query system.

As discussed above, information retrieval is the activity of obtaining information system resources that are relevant to an information need from a collection of those resources based on a query received from a user of the information retrieval system. Accordingly, traditional information retrieval systems typically employ an input field, such as a search bar, to manually receive search requests that comprise a text string from a user, and to generate queries based on the text strings. While these traditional information retrieval systems are effective in performing the function of generating queries based on manual inputs received from users, they traditionally require a number of interface elements to manually receive explicit text-based inputs, or selections of filter criteria, from users, and the users themselves may be required to come up with search terms and criteria on their own. As a result, these traditional systems may cause graphical user interfaces to become cluttered and visually distracting to users, while the users themselves may not know the correct search terms to input manually in all instances. An improved information retrieval system is therefore disclosed herein, which solves the above-mentioned technical problems through a system to generate contextual search queries based on implicit user interaction data and contextual information gathered at a client device.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details. According to certain example embodiments, a contextual query system is configured to perform operations that include: causing display of a graphical user interface at a client device, the graphical user interface including a display of image data that comprises a set of image features; generating a query based on the set of image features of the image data; accessing media content based on the query at a repository, the repository comprising a collection of media content; and causing display of a presentation of the media content within the graphical user interface at the client device.

According to certain example embodiments, the contextual query system may identify one or more objects depicted by the image data. For example, the contextual query system may access the image data and apply one or more computer vision and image processing techniques to detect semantic objects of one or more object classes based on the set of image features of the image data. The contextual query system may then generate a query based on the one or more object classes. In some embodiments, the presence of certain combinations of semantic objects may be correlated with certain media categories by the contextual query system for the purposes of generating a query. As an illustrative example, the contextual query system may detect a coffee mug, a book, and a computer based on the set of image features of the image data and access a database that comprises correlations of semantic objects with media categories. Accordingly, the semantic objects may be correlated with a media category for "office," or "work" media which comprises a collection of media items which are labeled or tagged with the corresponding media category.

In some embodiments, the collection of media content in the repository may be labeled or tagged based on crowd-sourced user inputs. For example, the contextual query system may be communicatively coupled to a messaging system wherein users of the messaging system provides inputs to generate messages that may include media items from among the collection of media content. The contextual query system may label the media content in the collection of media content based on metadata and content of the messages, as well as contextual data related to the messages (i.e., location in which user sent the message, time of day in which message was sent, keywords from the message, etc.). As an illustrative example, a user may generate a message that includes a selection of media content from the collection of media content. The message may comprise the media content, as well as a text string that comprises keywords, and metadata including temporal data, location data, and user profile data. Responsive to the user generating the message, the contextual query system may parse the message to label the media content within the repository based on the attributes of the message, such as the location data, the user profile data, and the keywords of the text string.

In some embodiments, the query may be generated based on the set of image features and contextual data, wherein the contextual data may include one or more of: message data; location data; temporal data; and user profile data. For example, to generate a query, the contextual query system may identify a set of image features depicted in an image presented at a client device, and access the contextual data that may include location data from the client device, temporal data from the client device, and user profile data of a user associated with the client device. In some embodiments, the location data may be based on geolocation coordinates generated by a client device or a geo-fence occupied by a client device.

In some embodiments, the media content may include audio clips or songs that comprise an associated identifier (i.e., a title, album art). In such embodiments, responsive to identifying the media content from the collection of media at the repository, the contextual query system may generate a ranking of the media content, wherein the ranking is based on attributes of the query and contextual data. The contextual query system may generate and cause display of a presentation of the media content within the GUI at the client device based on the ranking.

Consider an illustrative example from a user perspective. A user of a client device may provide one or more inputs to activate functions of the contextual query system. The inputs may for example include an input to capture image data, or an input to generate a message based on the image data. Responsive to receiving the input, the contextual query system accesses the image data and identifies one or more objects depicted in the image data based on a set of image features. The contextual query system may then classify the one or more objects, and generate a query based on the corresponding classifications. Based on the query, the contextual query system may access a repository that comprises a media collection to retrieve one or more media items, which in some embodiments may include songs. The contextual query system may then rank the media items identified in the repository, and cause display of a ranked presented of the media items at the client device.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a contextual query system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the databases) 120. Examples of functions and services supported by the social network system 122 include the identification of other users of the messaging system 100 with which a particular user has relationships or is "following," and also the identification of other entities and interests of a particular user. The contextual query system 124 provides functionality to generate and perform search queries based on various contextual inputs including image data.

The application server 112 is communicatively coupled to one or more database server(s) 118, which facilitates access to a database(s) 120 in which is stored data associated with messages processed by the messaging server application 114.

Figure 2:
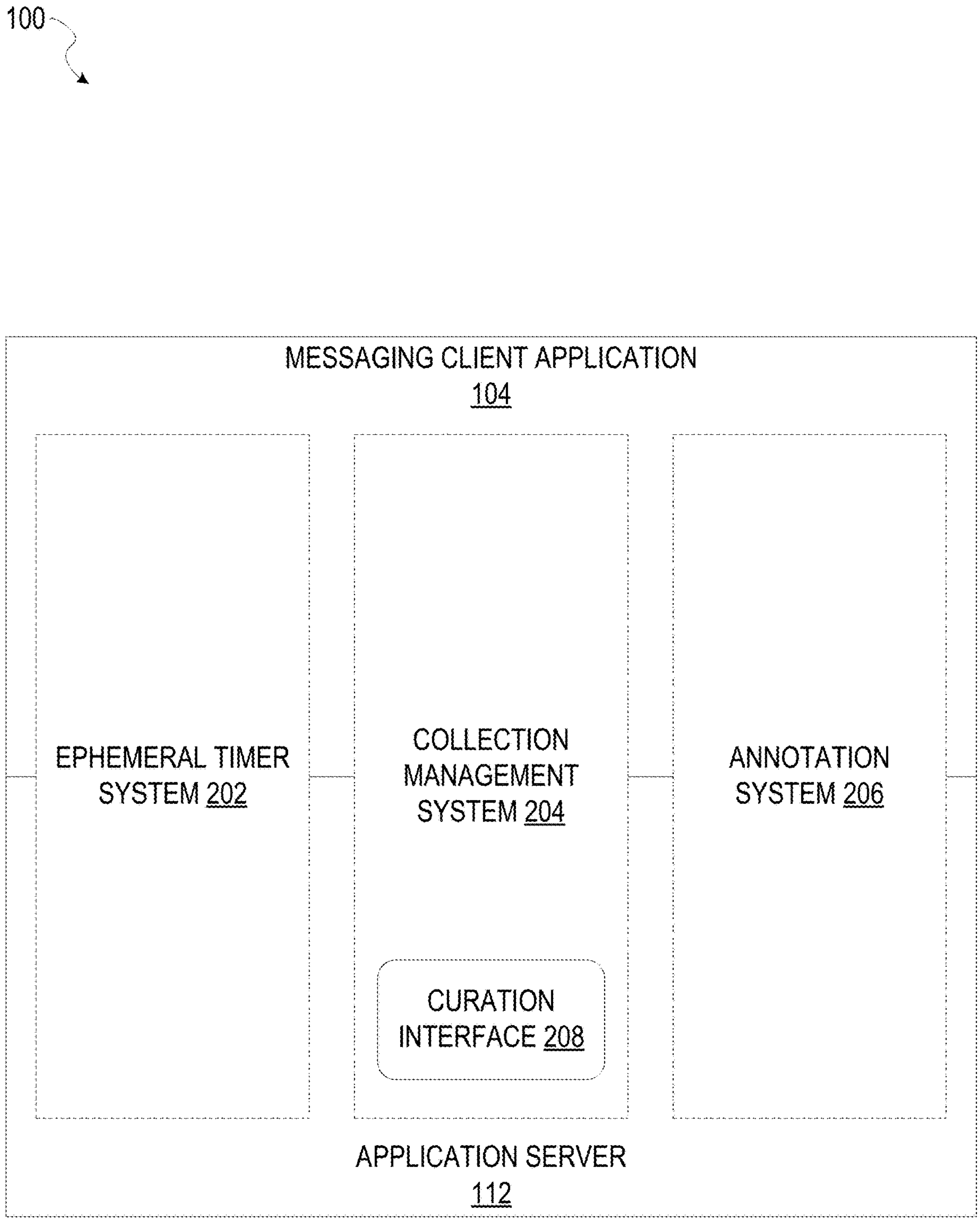
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content such as anamorphic media via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including anamorphic media, images, video, text and audio) may be organized into an "event gallery" or an "event story." Such a collection may be made available for a specified time period, such as the duration of an event to which the content relates. For example, content such as anamorphic media displayed at specific locations relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include anamorphic media, pictures, texts, logos, animations, and sound effects. An example of a visual effect includes color overlaying, or projecting an anamorphic media item over a presentation depicting a space. The audio and visual content or the visual effects can be applied to a media content item (e.g., a photo) at the client device 102. For example, the media overlay including text that can be overlaid on top of a photograph or video stream generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 120 and accessed through the database server(s) 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
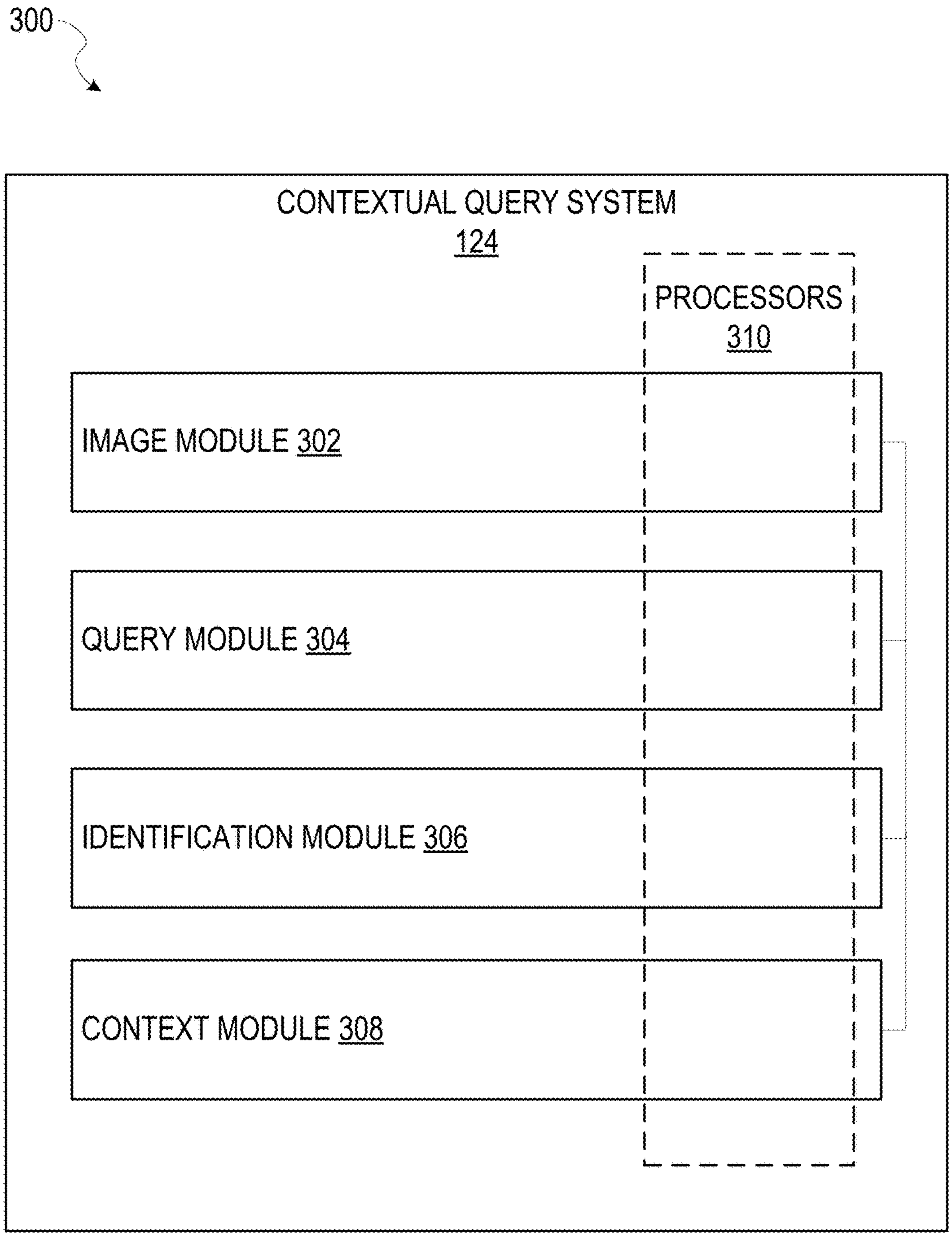
FIG. 3 is a block diagram illustrating various modules of a contextual query system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram 300 illustrating components of the contextual query system 124, that configure the contextual query system 124 to perform operations that include: causing display of a graphical user interface at a client device, the graphical user interface including a display of image data that comprises a set of image features; generating a query based on the set of image features of the image data; accessing media content based on the query at a repository, the repository comprising a collection of media content; and causing display of a presentation of the media content within the graphical user interface at the client device, according to various example embodiments. The contextual query system 124 is shown as including an image module 302, a query module 304, an identification module 306, and a context module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the contextual query system 124 may physically include an arrangement of one or more of the processors 310 (e.g., a subset of or among the one or more processors of the machine) configured to perform the operations described herein for that module. As another example, any module of the engagement tracking system 310 may include software, hardware, or both, that configure an arrangement of one or more processors 310 (e.g., among the one or more processors of the machine) to perform the operations described herein for that module. Accordingly, different modules of the contextual query system 124 may include and configure different arrangements of such processors 310 or a single arrangement of such processors 310 at different points in time. Moreover, any two or more modules of the contextual query system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
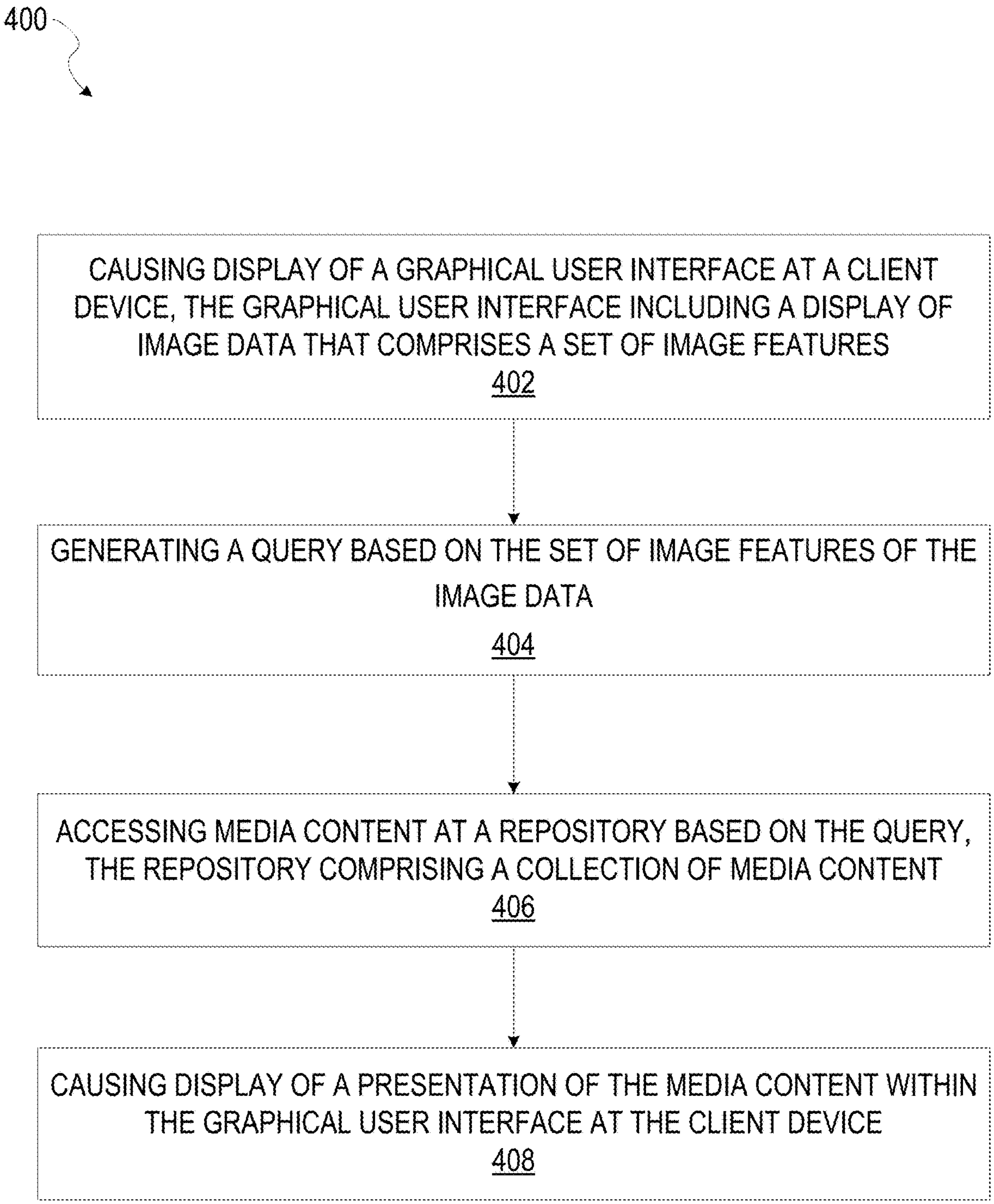
FIG. 4 is a flowchart illustrating a method of generating and causing display of a presentation of a set of media content based on a query, according to certain example embodiments.

FIG. 4 is a flowchart illustrating various operations of the contextual query system 124 in performing a method 400 of generating and causing display of a presentation of media content accessed based on a query, according to certain example embodiments. Operations of the method 400 may be performed by the modules described above with respect to FIG. 3. As shown in FIG. 4, the method 400 includes one or more operations 402, 404, 406, and 408.

At operation 402, the image module 302 causes display of a graphical user interface (GUI) at a client device 102, wherein the GUI includes a display of image data that comprises a set of image features. For example, the image data may be generated by one or more sensor devices (i.e., cameras) communicatively coupled to the client device 102, or in some embodiments may be accessed at a third-party resource, or the database 120.

At operation 404, the query module 304 generates a query based on at least the set of image features of the image data. For example, according to certain example embodiments, the identification module 306 may perform one or more computer vision techniques to identify elements depicted in the image data, based on the image features of the image data. The elements may for example include objects, people, locations, as well as weather conditions, and time of day (i.e., day or night). Accordingly, the query may comprise a set of keywords selected by the query module 304 based on the elements identified within the image data by the identification module 306.

At operation 406, the query module 304 accesses media content at a repository (i.e., the database 120) based on the query, wherein the repository comprises a collection of media content. According to certain example embodiments, the media content among the collection of media content may be tagged or labeled with keywords or indexed in categories based on the keywords. The media content may comprise media properties, such as an identifier.

At operation 408, the image module 302 causes display of a presentation of the media content identified by the query module 304 within the GUI at the client device 102. The presentation of the media content may for example comprise a display of a list of identifiers associated with the identified media content—for example, a list of song titles, or other identifiers. Accordingly, a contextually relevant selection of media content may be presented to the user at the client device 102, wherein the selection of media content is curated based on image features of image data presented at the client device 102.

Figure 5:
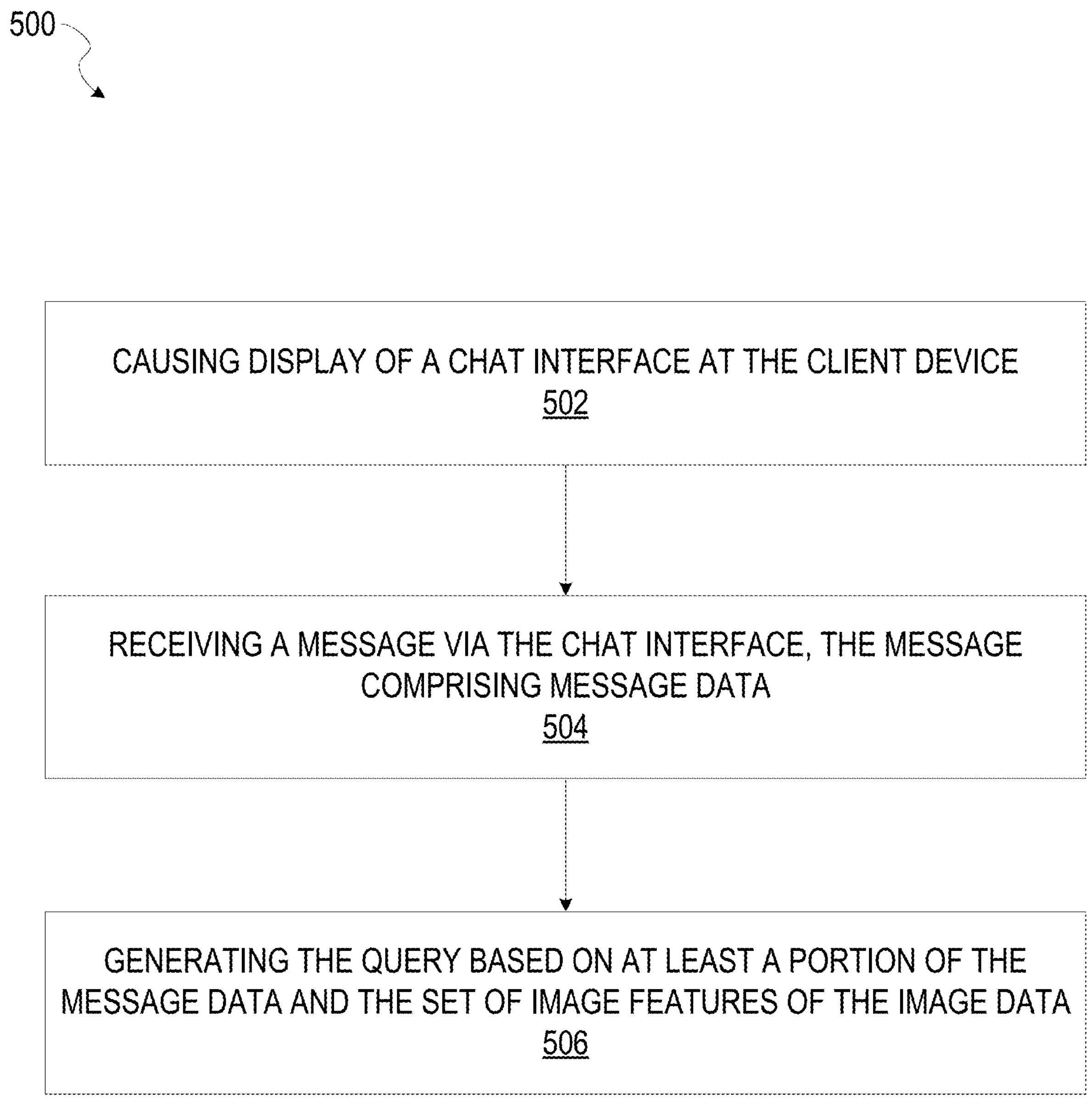
FIG. 5 is a flowchart illustrating a method of generating a query, according to certain example embodiments.

FIG. 5 is a flowchart illustrating various operations of the contextual query system 124 in performing a method 500 for generating a query, according to certain example embodiments. Operations of the method 500 may be performed by the modules described above with respect to FIG. 3. As shown in FIG. 5, the method 500 includes one or more operations 502, 504, and 506 that may be performed as part (e.g., a precursor task, a subroutine, or a portion) of the method 400, according to some example embodiments. For example, the method 500 may be performed as a subroutine to operation 404 of the method 400.

At operation 502, one or more modules of the contextual query system 124 causes display of a chat interface within the GUI at the client device 102. For example, the chat interface may comprise a message feed to display messages sent between one or more users of the messaging system 100.

At operation 504, the context module 308 accesses one or more messages presented within the chat interface, wherein the one or more messages comprise message data. The message data may for example include message metadata, indicating a time, date, and location in which a message was sent or received, as well as a user identifier associated with the message, and message content, wherein the message content may include media as well as text content.

At operation 506, the query module 304 generates the query based on at least a portion of the message data, and the set of image features of the image data.

Figure 6:
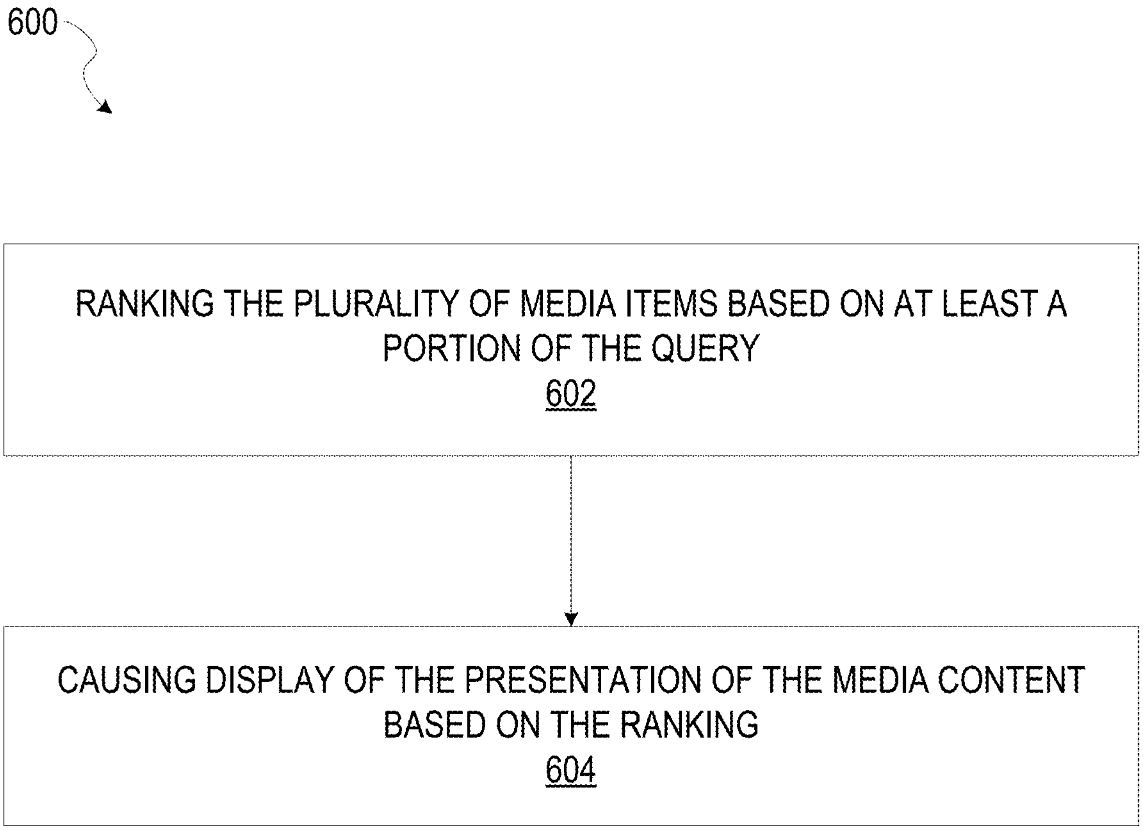
FIG. 6 is a flowchart illustrating a method for causing display of a presentation of media items based on a contextual query, according to certain example embodiments.

FIG. 6 is a flowchart illustrating various operations of the contextual query system 124 in performing a method 600 for causing display of a presentation of media content based on a query, according to certain example embodiments. Operations of the method 600 may be performed by the modules described above with respect to FIG. 3. As shown in FIG. 6, the method 600 includes one or more operations 602, and 604 that may be performed as part (e.g., a precursor task, a subroutine, or a portion) of the method 400, according to some example embodiments. For example, the method 600 may be performed as a subroutine of operation 408 of the method 400.

At operation 602, the query module 304 ranks the plurality of media items identified based on the set of image features of the image data based on at least a portion of the query. For example, the query may be generated based on contextual data that includes location data, temporal data, as well as user profile data.

At operation 604, the image module 302 causes display of a presentation of the media content at the client device 102 based on the ranking.

Figure 7:
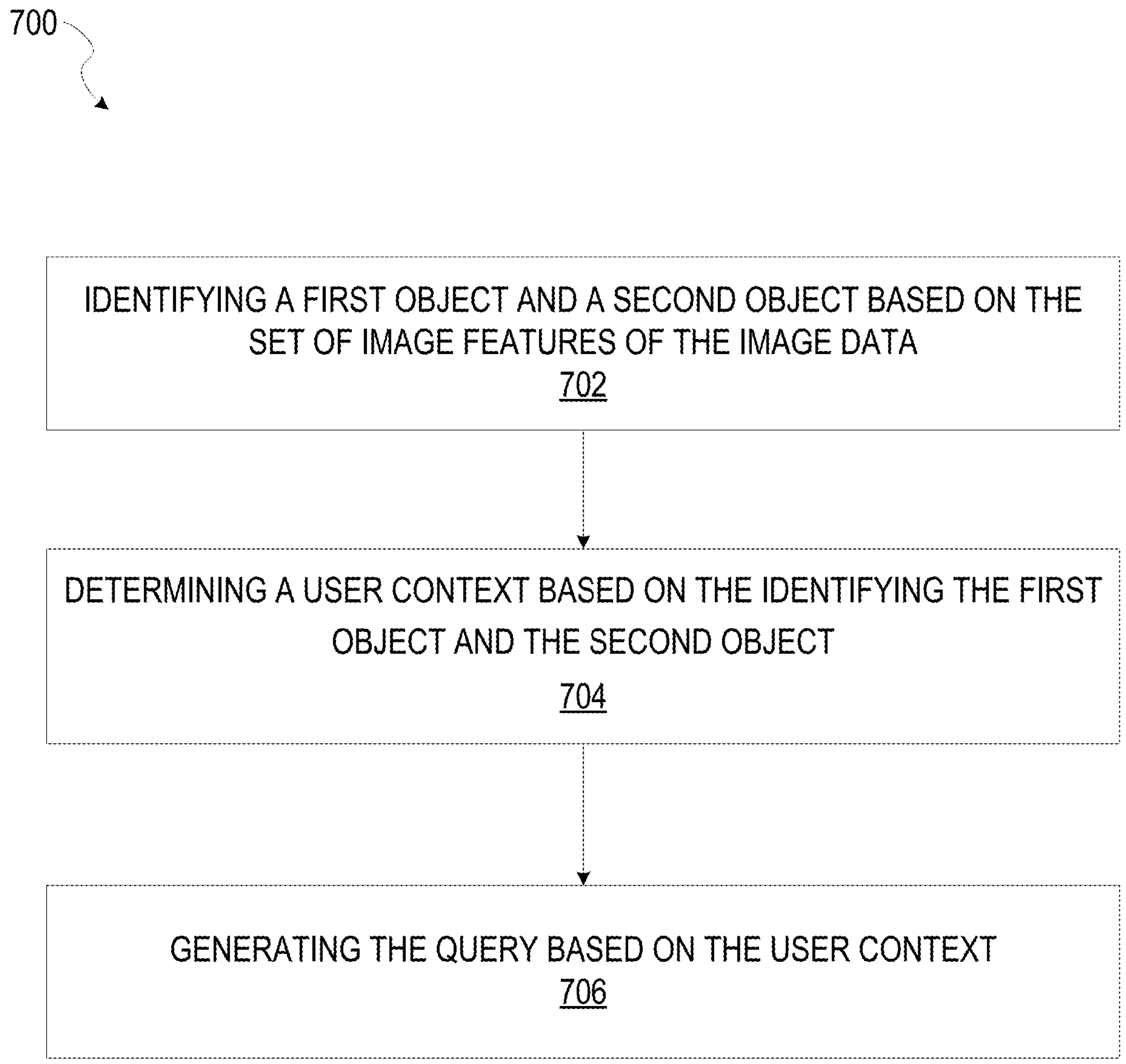
FIG. 7 is a flowchart illustrating a method of generating a query, according to certain example embodiments.

FIG. 7 is a flowchart illustrating various operations of the contextual query system 124 in performing a method 700 of generating a query, according to certain example embodiments. Operations of the method 700 may be performed by the modules described above with respect to FIG. 3. As shown in FIG. 7, the method 700 includes one or more operations 702, 704, and 706 that may be performed as part (e.g., a precursor task, a subroutine, or a portion) of the method 400, according to some example embodiments. For example, the method 700 may be performed as a subroutine to operation 404 of the method 400.

At operation 702, the identification module 306 identifies a first object and a second objects based on the set of image features of the image data presented at the client device 102. For example, as discussed above, the identification module 306 may perform one or more computer vision and pattern recognition techniques to identify one or more objects depicted in the image data.

At operation 704, the context module 308 determines a user context based on the identification of the first object and the second object within the image data. For example, the context module 308 may access a repository comprising a list of user context correlated with keywords associated with objects. The context module 308 may therefore access the repository and determine the user context based on the identification of the first object and the second object.

At operation 706, the query module 304 generates the query based on the user context. As an illustrative example, the first object and the second object may include objects commonly found in an office (i.e., computer, pen, coffee mug, office chair, etc.). The identification module 302 identifies the first object and the second object, and provides the context module 308 with one or more keywords associated with the identified objects. The context module 308 may thereby access a database 120 to determine a user context based on the one or more keywords. Accordingly, as discussed above, combinations of certain keywords may be correlated to specific user contexts within the database 120. The context module 308 may determine the user context based on the one or more objects detected within the image data.

Figure 8:
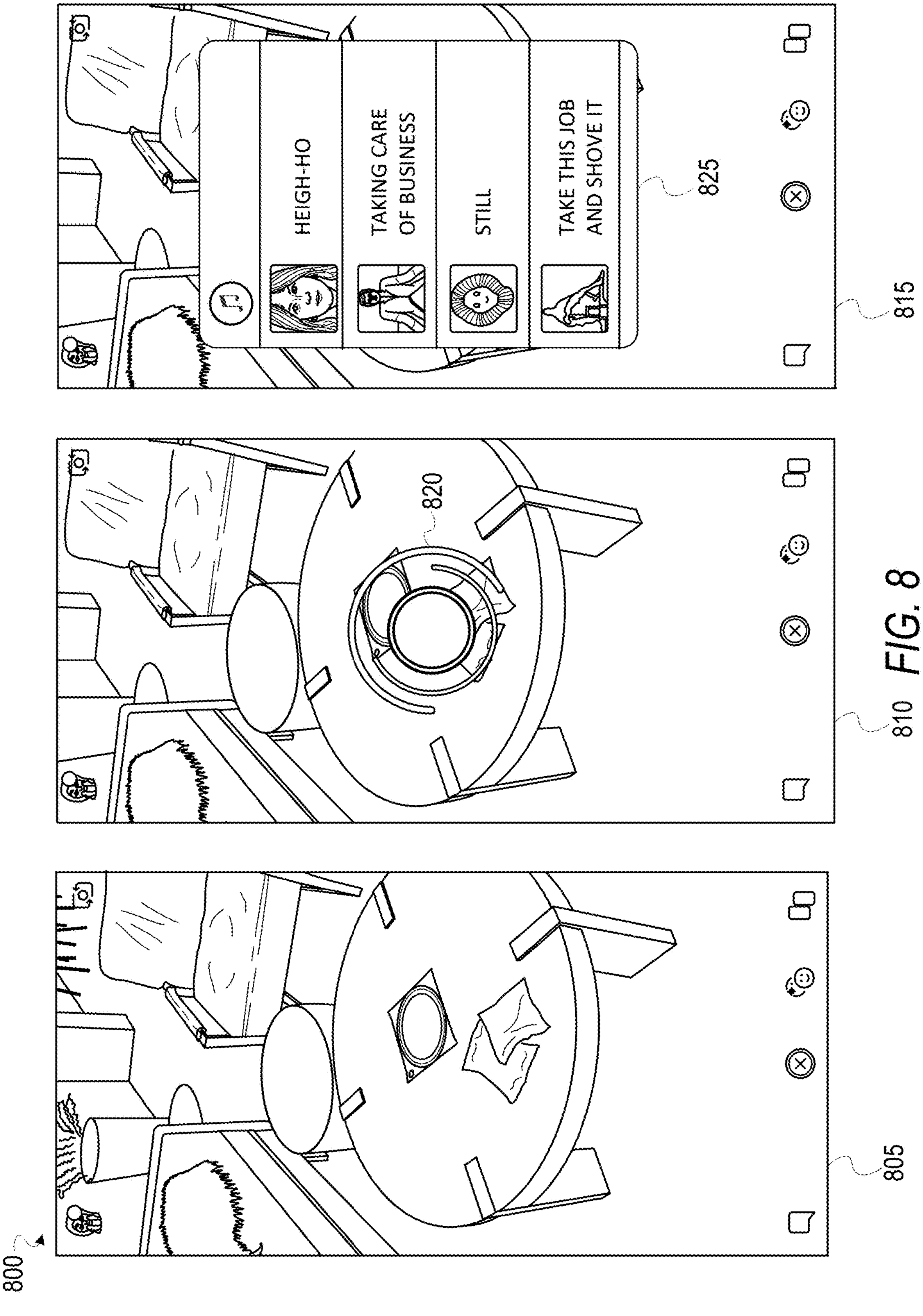
FIG. 8 is an interface flow-diagram illustrating a presentation of media items identified based on a contextual query, according to certain example embodiments.

FIG. 8 is an interface flow-diagram 800 illustrating a presentation of media items 825 identified based on a contextual query, according to certain example embodiments.

Interface 805 comprises a display of image data within a GUI. As seen in the interface 805, the image data may comprise a set of image features depicting one or more objects.

Interface 810 comprises a display of an input indicator 820. In some embodiments, a user of the client device 102 may provide a tactile input at a position within the presentation of the image data at the client device 102, wherein the input may cause the contextual query system 124 to perform one or more operations to generate a contextual query as discussed above some embodiments, the contextual query system 124 may generate a contextual query based on a position of the input, as indicated by the input indicator 820. For example, the input may identify a location of one or more objects depicted by the presentation of the image data. In such embodiments, the contextual query system 124 may generate a query based on the objects that correspond with the location of the input.

In some embodiments, the input indicator 820 may automatically display responsive to the contextual query system 124 identifying one or more objects depicted within the presentation of the image data at the client device 102.

Interface 815 comprises a display of media items 825, wherein the media items 825 are curated based on a query generated based on the set of image features of the image data, as described in the methods 400, 500, 600, and 700 discussed above. Accordingly, the presentation of the media items 825 may comprise a list of songs relevant to a user context as determined by the contextual query system 124.

Software Architecture

Figure 9:
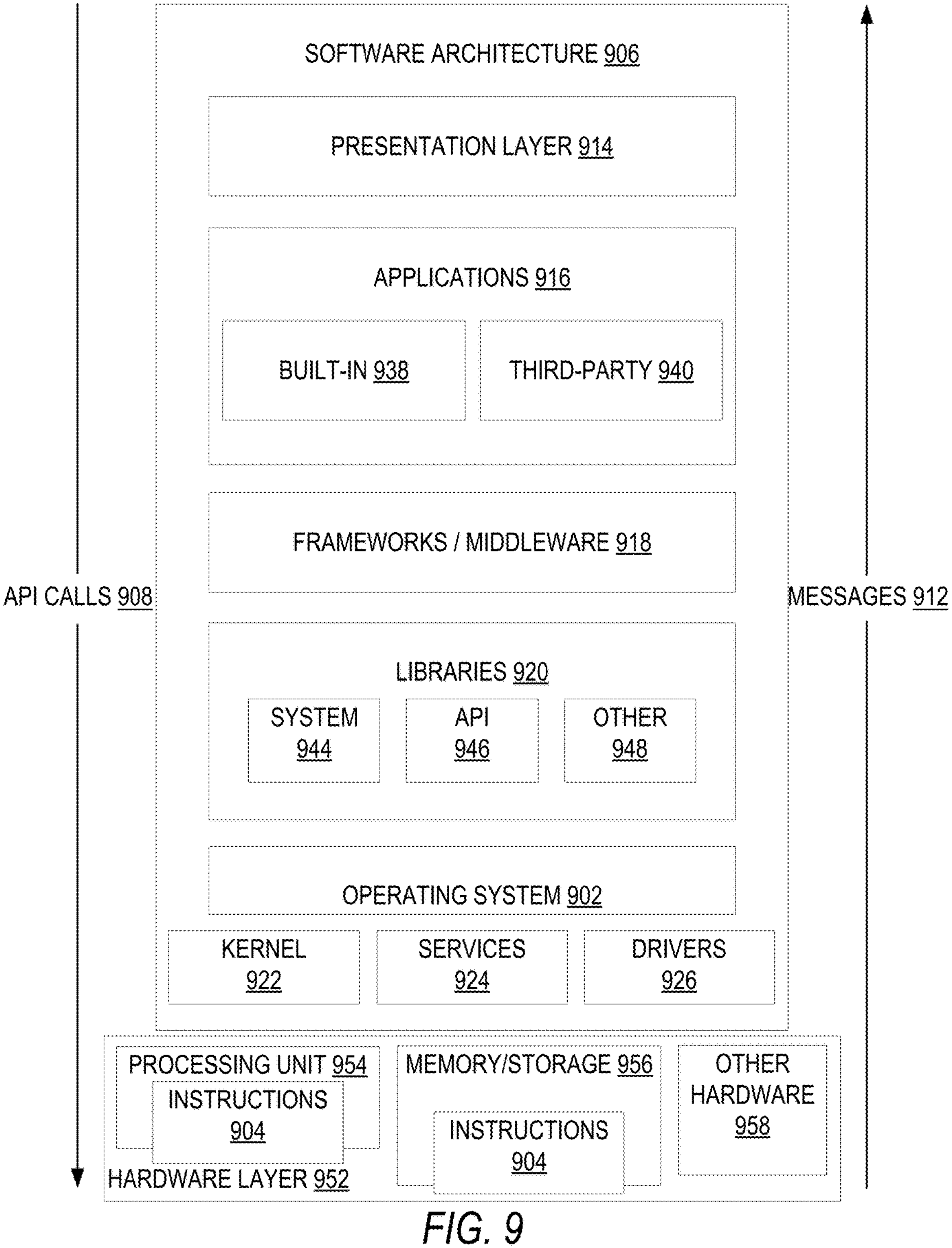
FIG. 9 is a block diagram illustrating a representative software architecture, which may be used in conjunction with various hardware architectures herein described and used to implement various embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
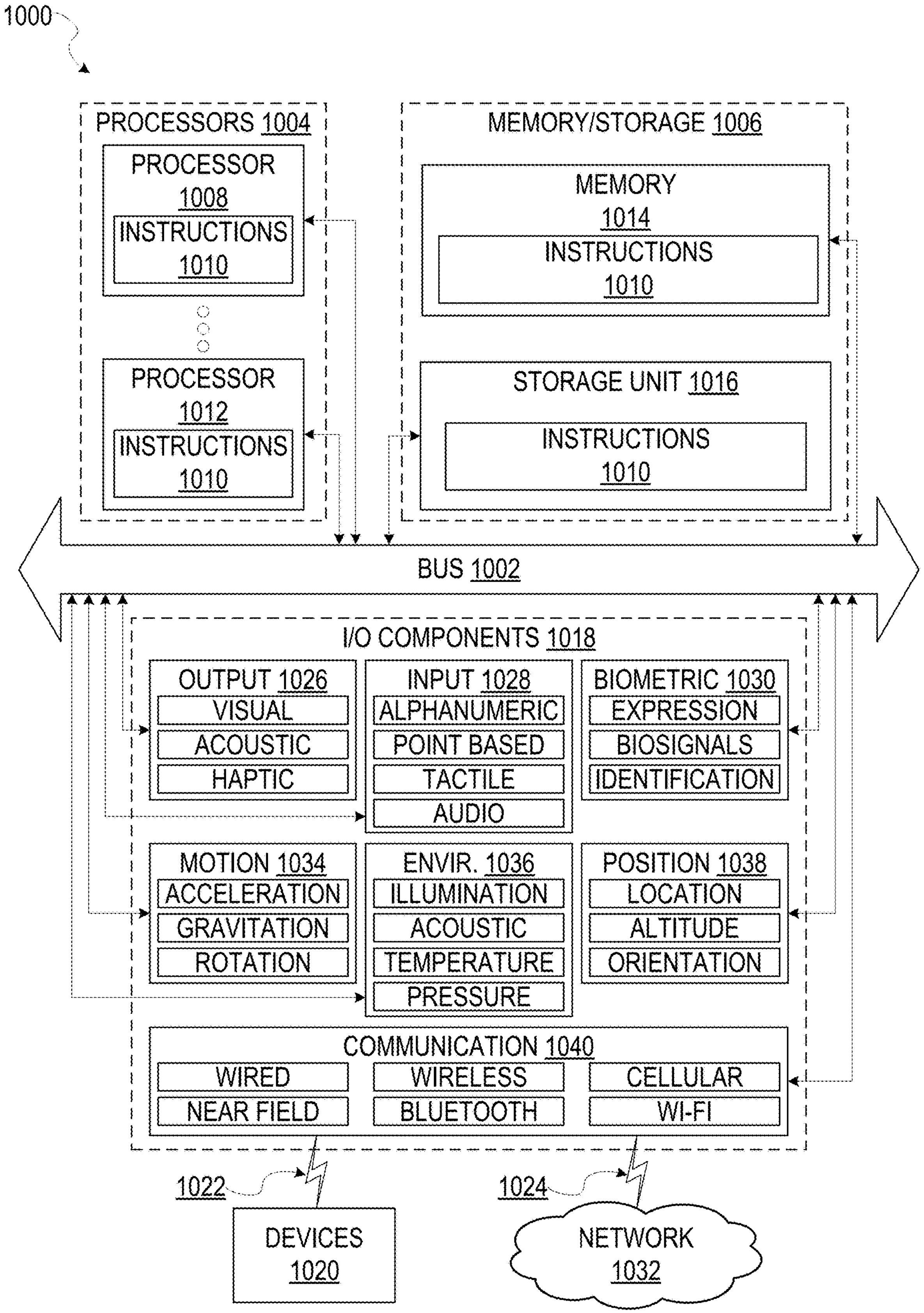
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:

causing display of a graphical user interface at a client device, the graphical user interface including a display of image data that comprises a set of image features;

detecting a combination of a set of semantic objects within the image data based on the set of image features of the image data, the combination of the set of semantic objects corresponding with a media category;

selecting the media category from among a set of media categories based on the combination of the set of semantic objects and contextual data associated with the client device;

accessing the contextual data associated with the client device;

generating a query to a media repository based on the contextual data and the selected media category;

accessing media content from the media repository based on the query; and causing display of a presentation of the media content within the graphical user interface at the client device.

2. The method of claim 1, wherein the contextual data comprises one or more of:

location data;

temporal data; and user profile data.

3. The method of claim 1, wherein the accessing the media content from the media repository further comprises:

causing display of a chat interface at the client device;

receiving a message via the chat interface, the message comprising message data; and generating the query further based on at least a portion of the message data.

4. The method of claim 1, wherein the media content further comprises one or more media identifiers, and the presentation of the media content comprises a list of the one or more media identifiers of the media content.

5. The method of claim 1, wherein the media content further comprises a plurality of media items, and the method further comprises:

ranking the plurality of media items; and wherein the presentation of the media content is based on the ranking.

6. The method of claim 5, wherein the ranking the plurality of media items includes:

accessing contextual data at the client device; and ranking the plurality of media items based on the contextual data.

7. A system comprising:

a memory; and at least one hardware processor coupled to the memory and comprising instructions that cause the system to perform operations comprising:

causing display of a graphical user interface at a client device, the graphical user interface including a display of image data that comprises a set of image features;

detecting a combination of a set of semantic objects within the image data based on the set of image features of the image data, the combination of the set of semantic objects corresponding with a media category;

selecting the media category from among a set of media categories based on the combination of the set of semantic objects and contextual data associated with the client device;

accessing the contextual data associated with the client device;

generating a query to a media repository based on the contextual data and the selected media category;

accessing media content from the media repository based on the query; and causing display of a presentation of the media content within the graphical user interface at the client device.

8. The system of claim 7, wherein the contextual data comprises one or more of:

location data;
temporal data; and
user profile data.

9. The system of claim 7, wherein the accessing the media content from the media repository further comprises:
causing display of a chat interface at the client device;
receiving a message via the chat interface, the message comprising message data; and
generating the query further based on at least a portion of the message data.

10. The system of claim 7, wherein the media content further comprises one or more media identifiers, and the presentation of the media content comprises a list of the one or more media identifiers of the media content.

11. The system of claim 7, wherein the media content further comprises a plurality of media items, and the operations further comprises:
ranking the plurality of media items; and
wherein the presentation of the media content is based on the ranking.

12. The system of claim 11, wherein the ranking the plurality of media items includes:
accessing the contextual data at the client device; and
ranking the plurality of media items based on the contextual data.

13. A non-transitory machine-readable storage medium comprising instructions that, when executed by one or more processors of a machine, cause the machine to perform operations comprising:
causing display of a graphical user interface at a client device, the graphical user interface including a display of image data that comprises a set of image features;
detecting a combination of a set of semantic objects within the image data based on the set of image features of the image data, the combination of the set of semantic objects corresponding with a media category;
selecting the media category from among a set of media categories based on the combination of the set of semantic objects and contextual data associated with the client device;
accessing the contextual data associated with the client device;
generating a query to a media repository based on the contextual data and the selected media category;
accessing media content from the media repository based on the query; and
causing display of a presentation of the media content within the graphical user interface at the client device.

14. The non-transitory machine-readable storage medium of claim 13, wherein the contextual data comprises one or more of:
location data;
temporal data; and
user profile data.

15. The non-transitory machine-readable storage medium of claim 13, wherein the accessing the media content from the media repository further comprises:
causing display of a chat interface at the client device;
receiving a message via the chat interface, the message comprising message data; and
generating the query further based on at least a portion of the message data.

16. The non-transitory machine-readable storage medium of claim 13, wherein the media content further comprises one or more media identifiers, and the presentation of the media content comprises a list of the one or more media identifiers of the media content.

17. The non-transitory machine-readable storage medium of claim 13, wherein the media content further comprises a plurality of media items, and the operations further comprise:
ranking the plurality of media items; and
wherein the presentation of the media content is based on the ranking.

* * * * *